June 11, 1929.  R. H. LAWSON  1,716,450
REVERSE PLAITING MECHANISM AND METHOD
Filed May 10, 1926  12 Sheets-Sheet 2

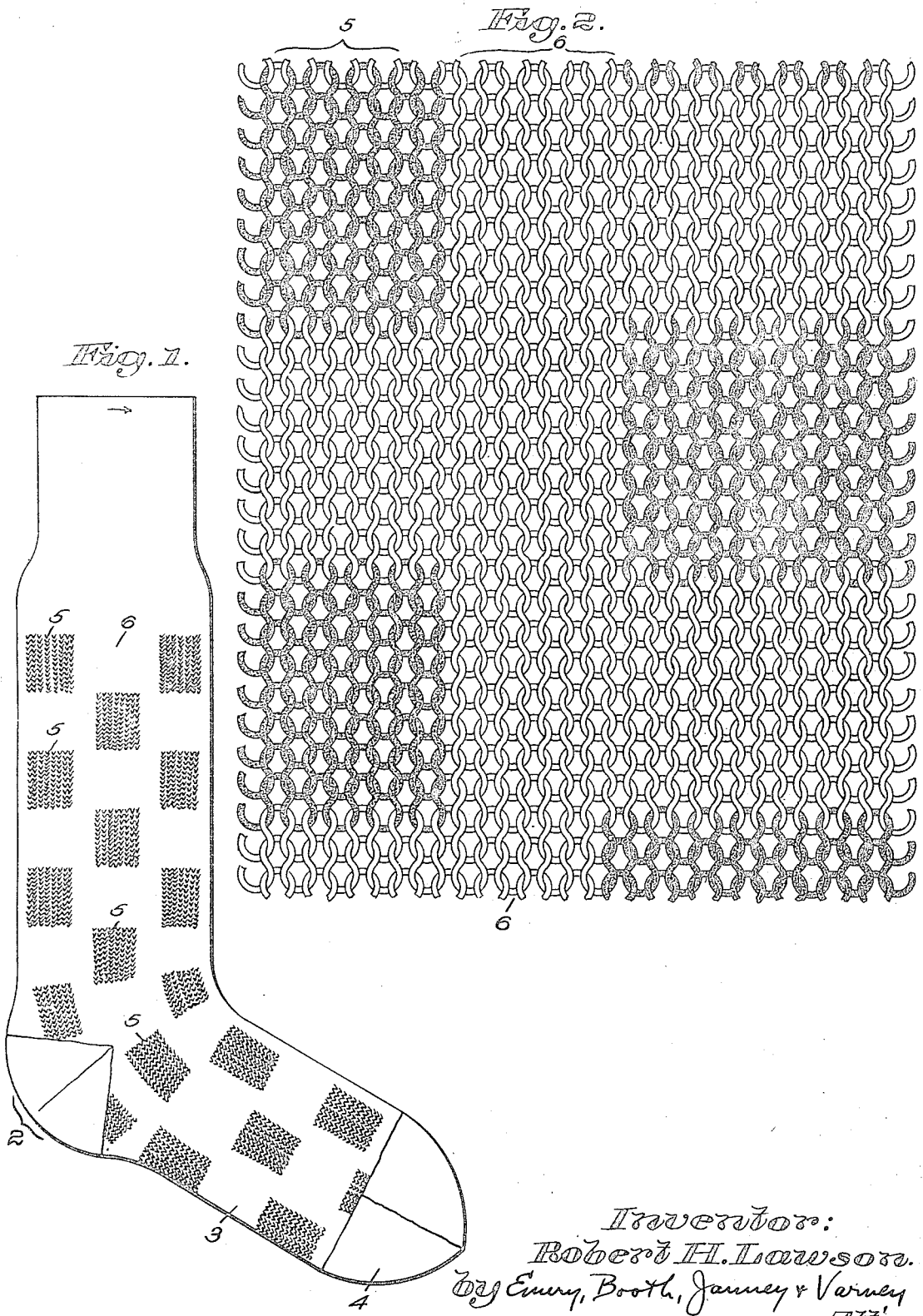

Inventor:
Robert H. Lawson.
by Emery, Booth, Janney & Varney
Attys.

June 11, 1929.  R. H. LAWSON  1,716,450
REVERSE PLAITING MECHANISM AND METHOD
Filed May 10, 1926   12 Sheets-Sheet 3

Inventor:
Robert H. Lawson.
by Emery, Booth, Janney & Varney
Attys

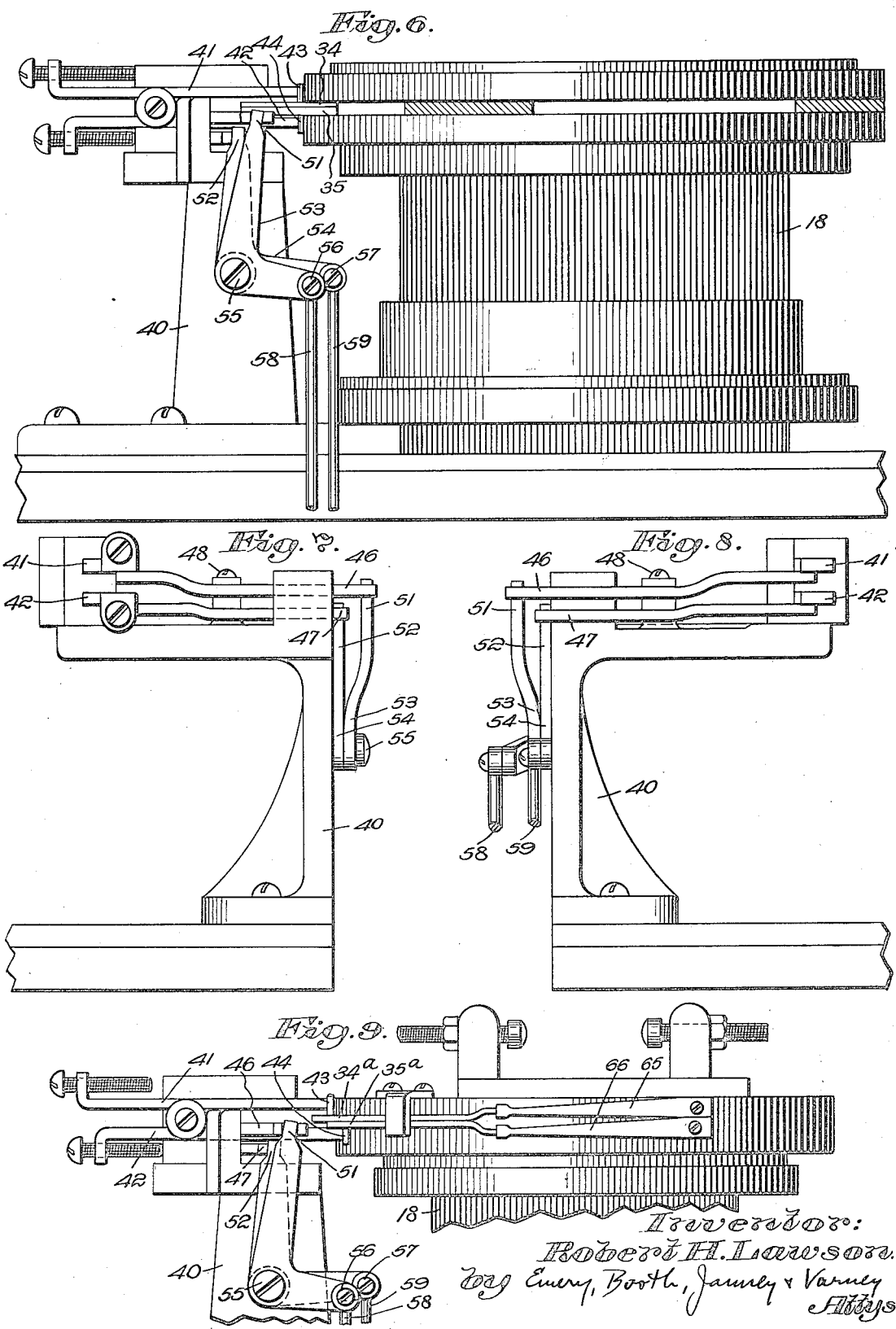

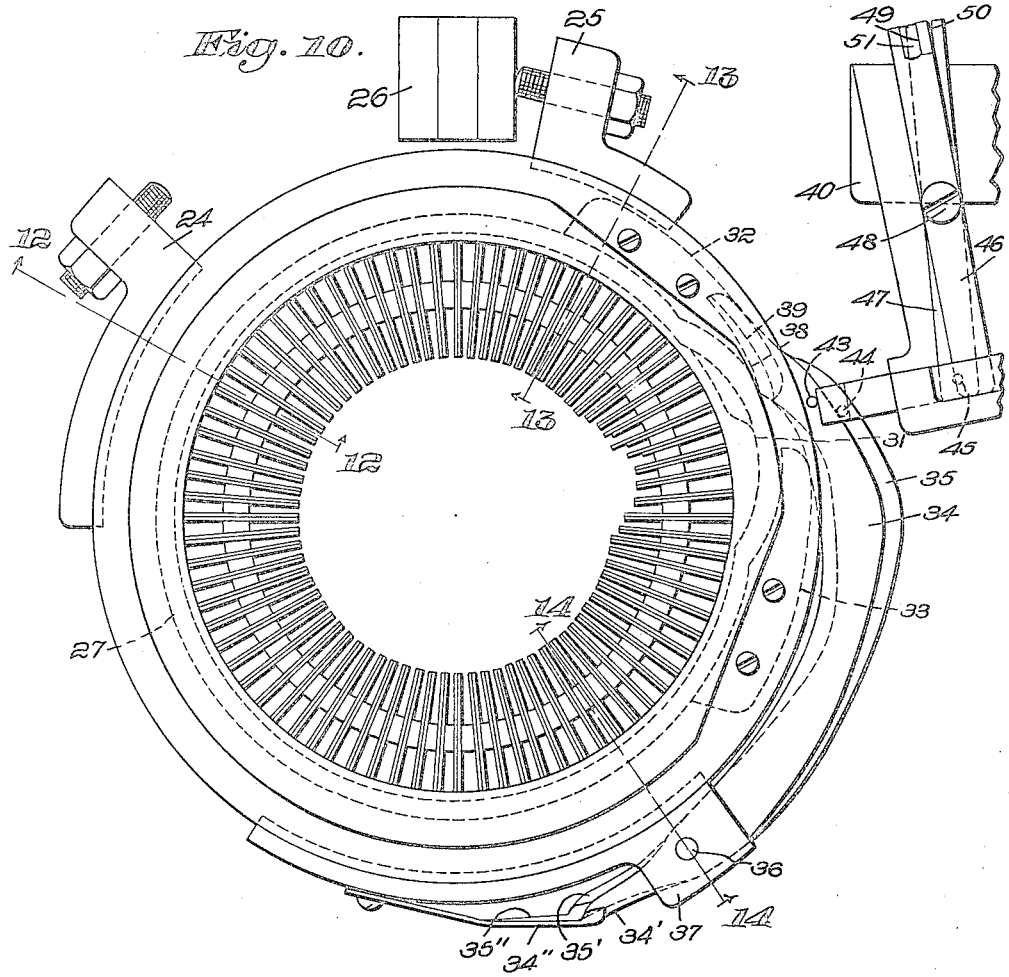
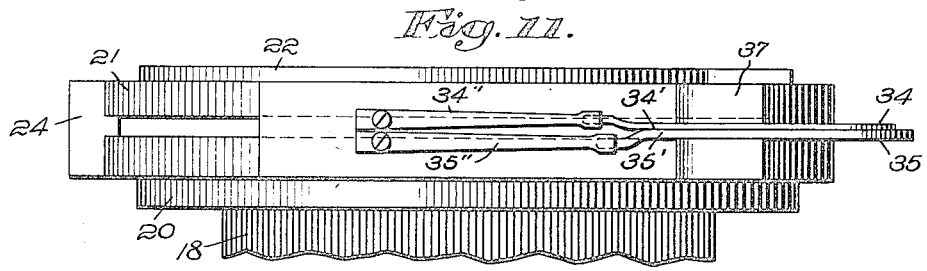
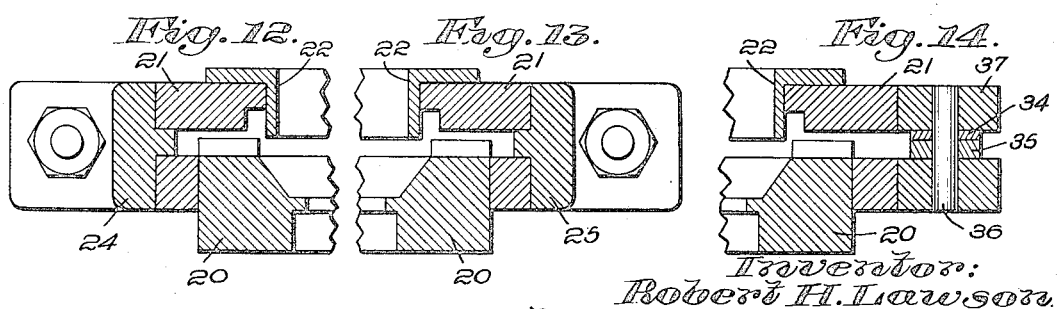

June 11, 1929.  R. H. LAWSON  1,716,450
REVERSE PLAITING MECHANISM AND METHOD
Filed May 10, 1926   12 Sheets-Sheet 6
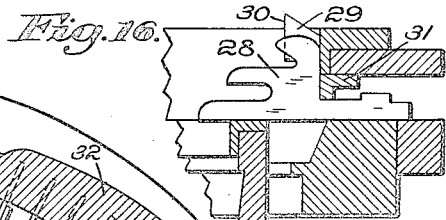
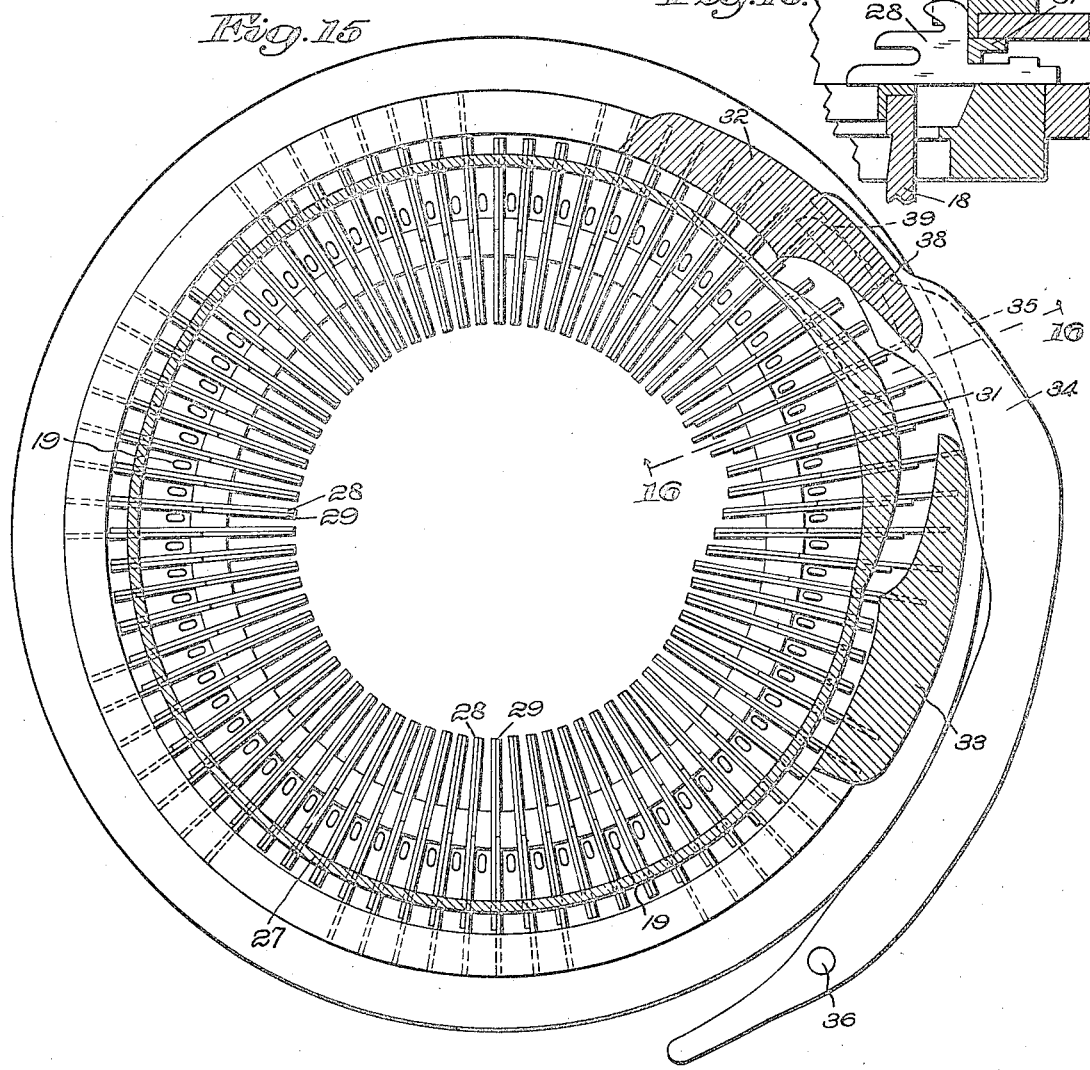
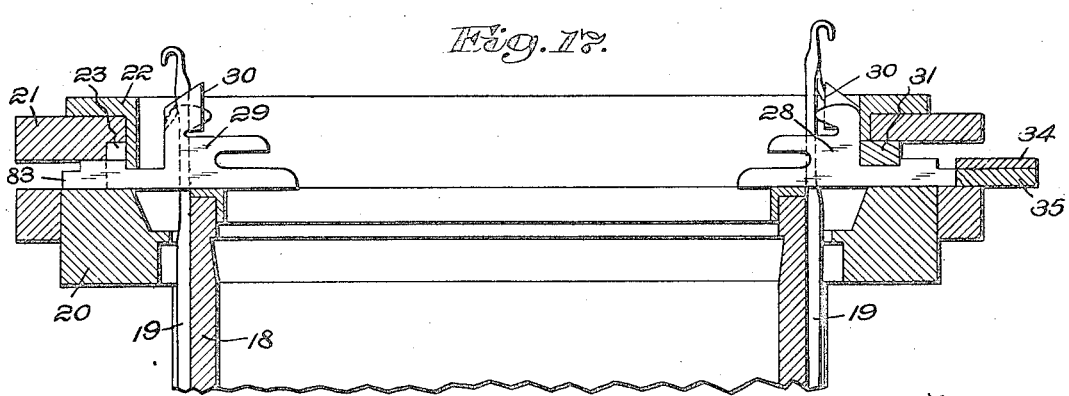
Inventor:
Robert H. Lawson.
By Emery, Booth, Janney & Varney
Attys.

June 11, 1929.   R. H. LAWSON   1,716,450
REVERSE PLAITING MECHANISM AND METHOD
Filed May 10, 1926   12 Sheets-Sheet 8

Inventor:
Robert H. Lawson,
By Emery, Booth, Janney & Varney
Attys.

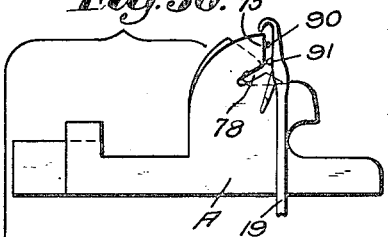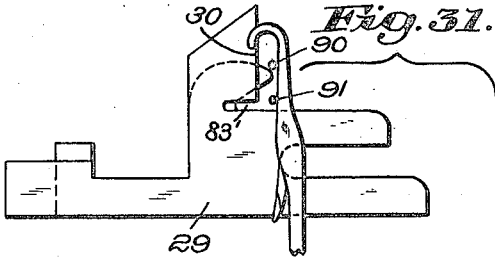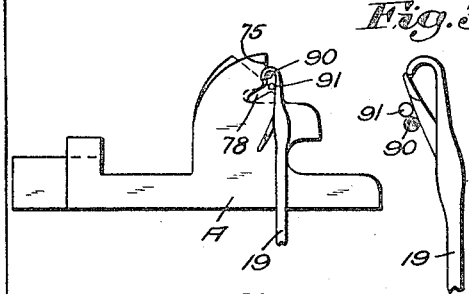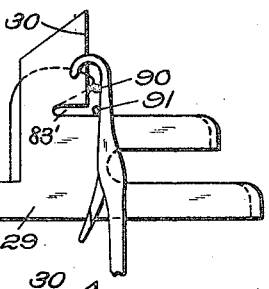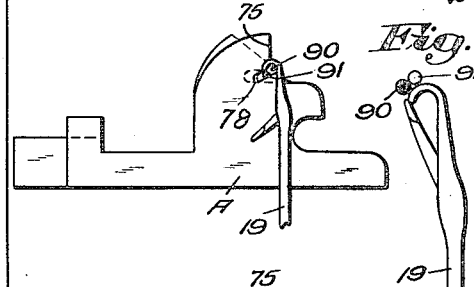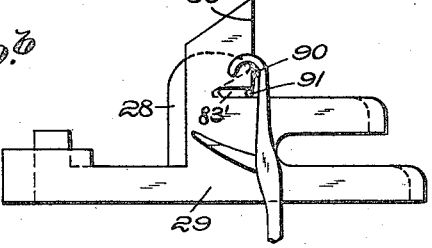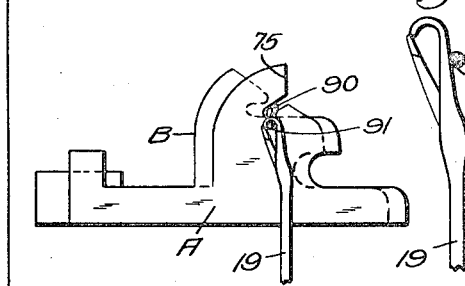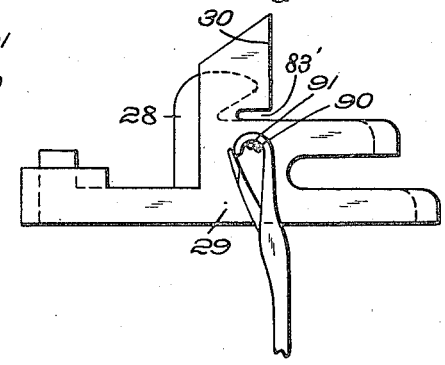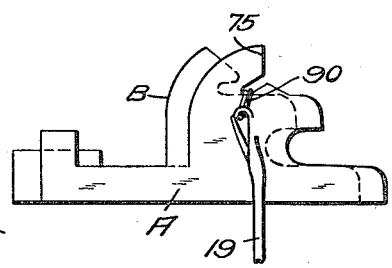

June 11, 1929.  R. H. LAWSON  1,716,450
REVERSE PLAITING MECHANISM AND METHOD
Filed May 10, 1926  12 Sheets-Sheet 12
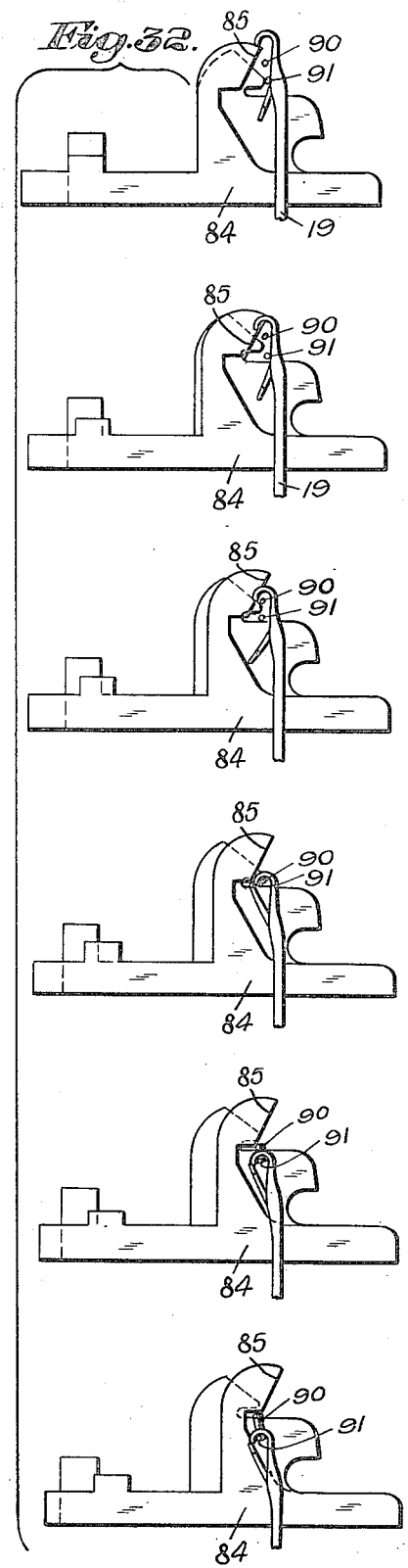
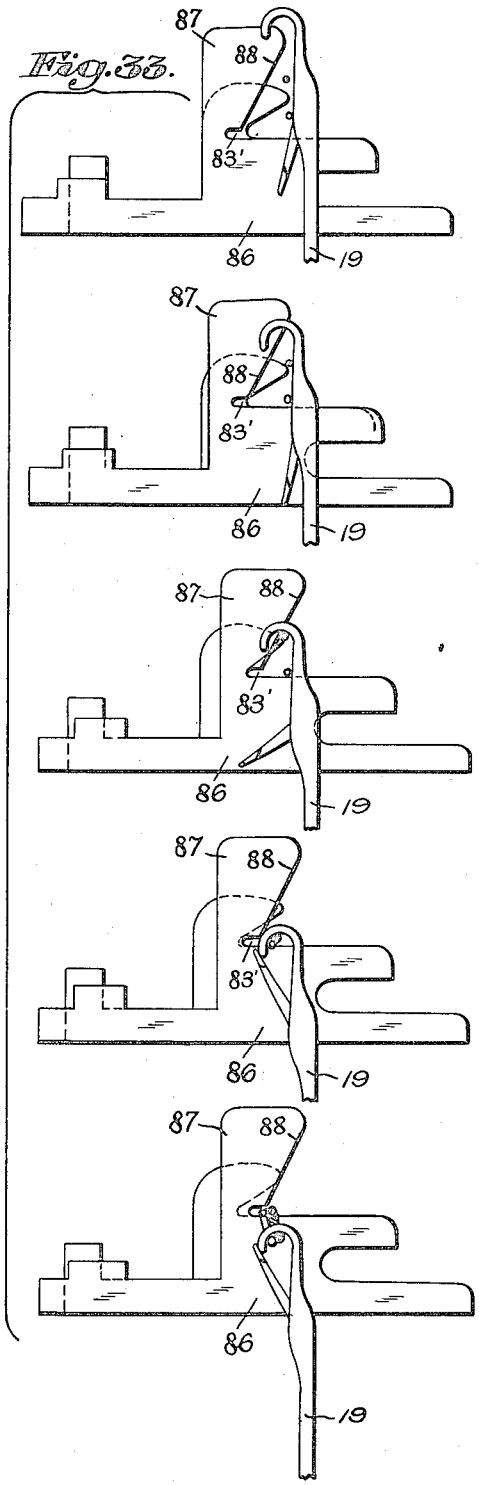
Inventor:
Robert H. Lawson.
By Emery, Booth, Janney & Varney
Attys.

Patented June 11, 1929.

1,716,450

UNITED STATES PATENT OFFICE.

ROBERT H. LAWSON, OF PAWTUCKET, RHODE ISLAND, ASSIGNOR TO HEMPHILL COMPANY, OF CENTRAL FALLS, RHODE ISLAND, A CORPORATION OF MASSACHUSETTS.

REVERSE PLAITING MECHANISM AND METHOD.

Application filed May 10, 1926. Serial No. 107,921.

This invention relates to improved means and method for effecting reverse plaiting, particularly in machines having independently operated needles. In order that the principles of the invention may be readily understood I have disclosed certain embodiments thereof in the accompanying drawings, wherein Fig. 1 represents a hose having areas of normal plaiting and areas of reverse plaiting, the latter being shown as blocks;

Fig. 2 is a view upon a much enlarged scale of a portion of the fabric shown in Fig. 1;

Fig. 6 is a rear elevation of the head of the machine shown in Fig. 5, with parts pertaining to my invention associated therewith;

Fig. 7 is a detail in side elevation viewing Fig. 6 from the left;

Fig. 8 is a similar detail but viewing Fig. 6 from the right;

Fig. 9 is a detail showing in rear elevation, a portion of the mechanism of my invention particularly as applied to a fine gauge machine;

Fig. 10 is a plan showing regular web holders, and the special instrumentalities of my invention and the operating means therefor as employed in a coarse gauge machine;

Fig. 11 is a side elevation of the construction shown in Fig. 10, looking toward the pivotal point for the levers which act upon the special instrumentalities;

Figure 18:
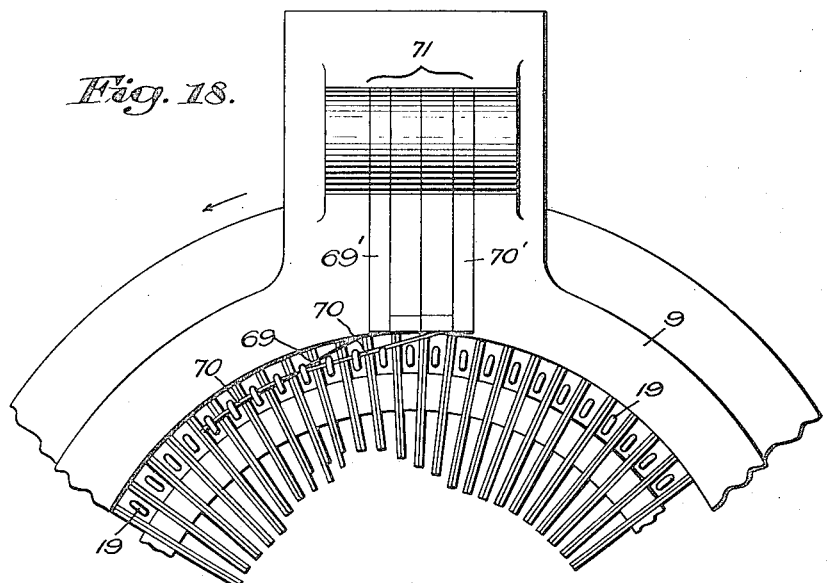
Figure 19:
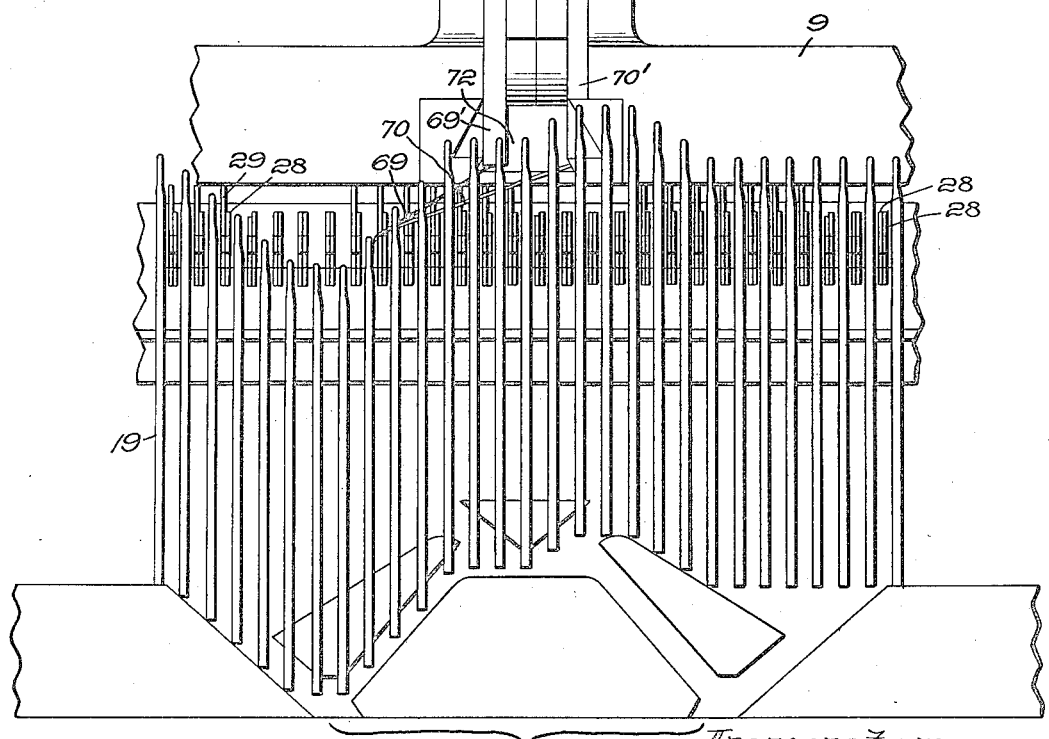
Figure 20:
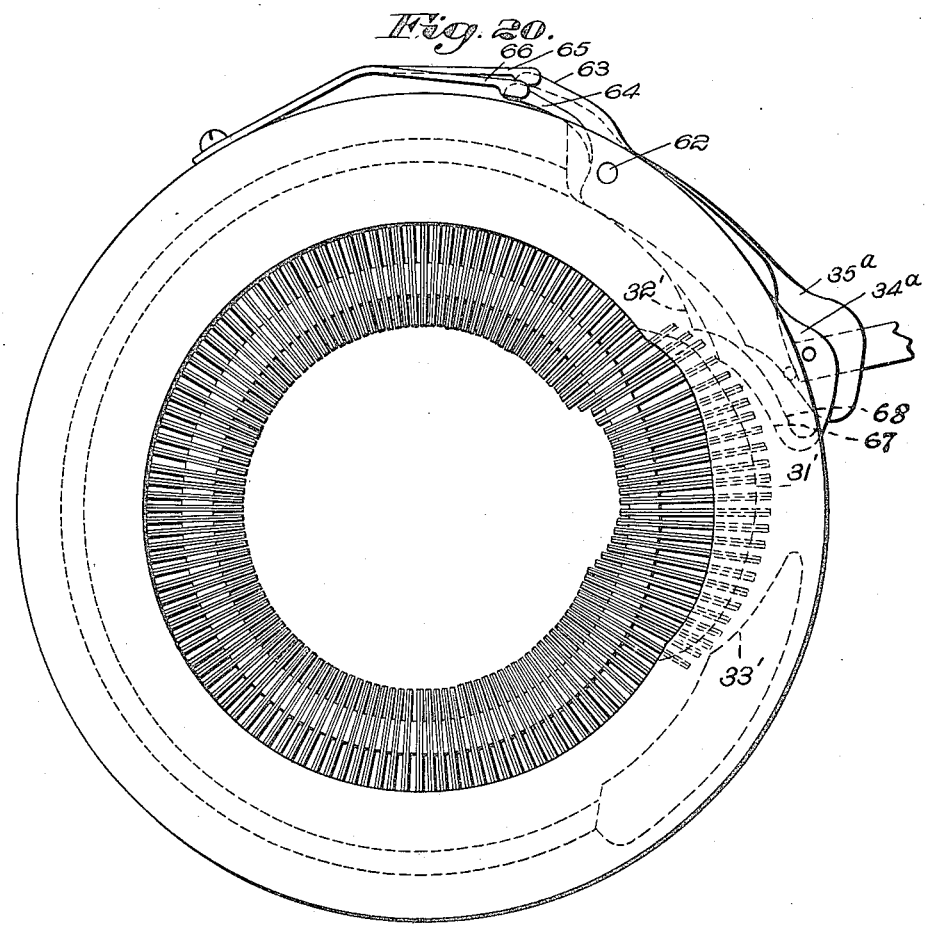
Figure 21:
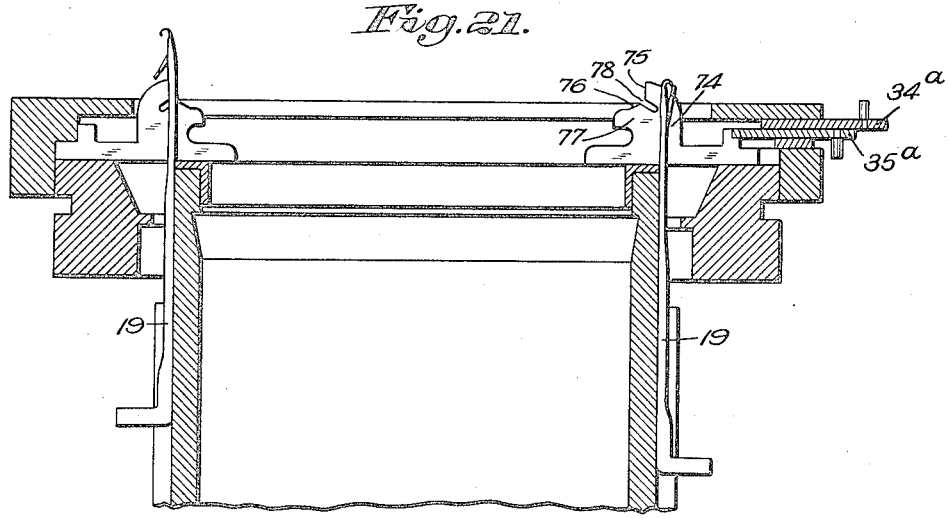
Figure 22:
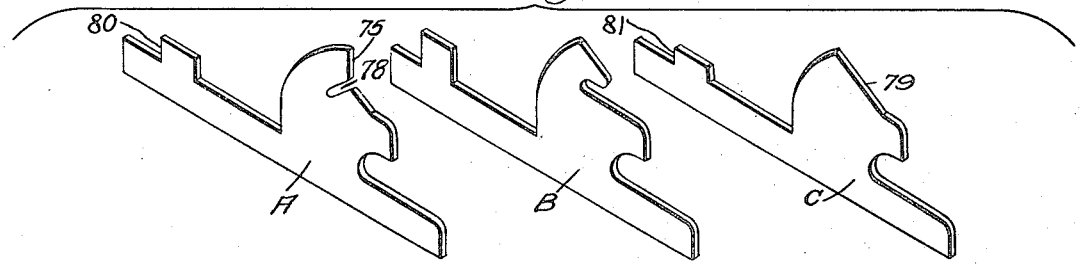
Figure 23:
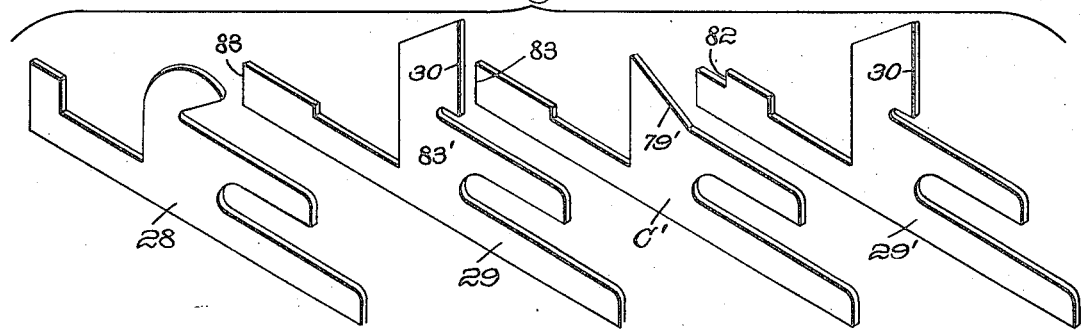
Figure 24:
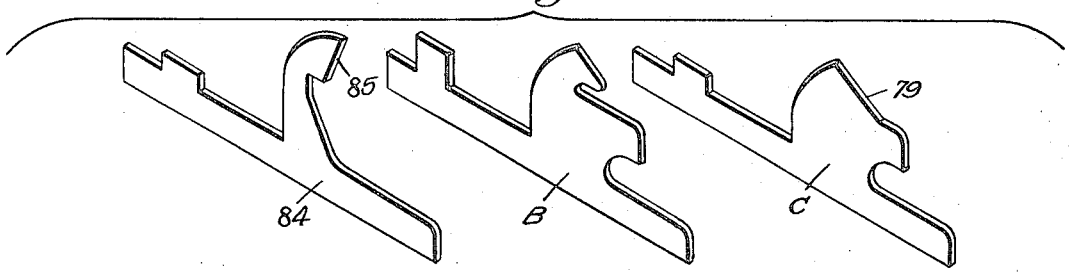
Figure 25:
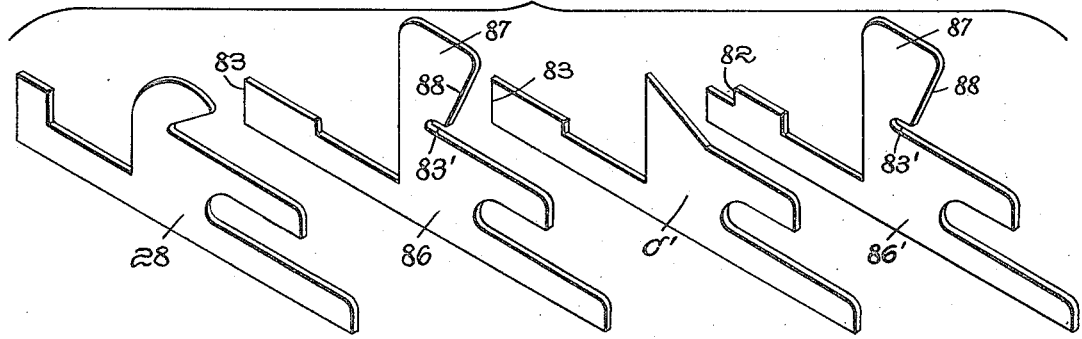
Figure 26:
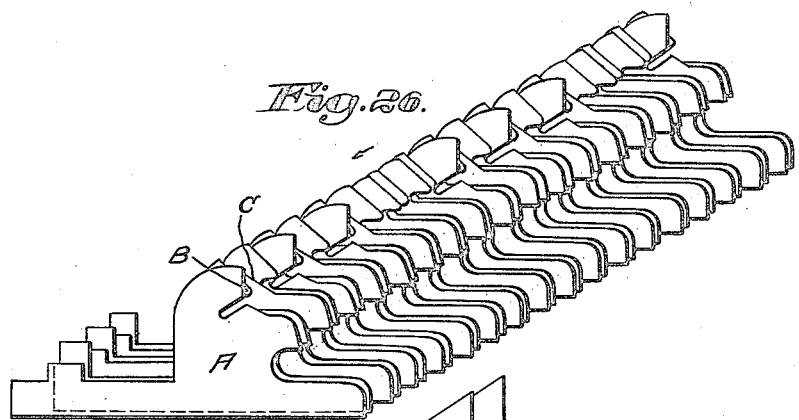
Figure 27:
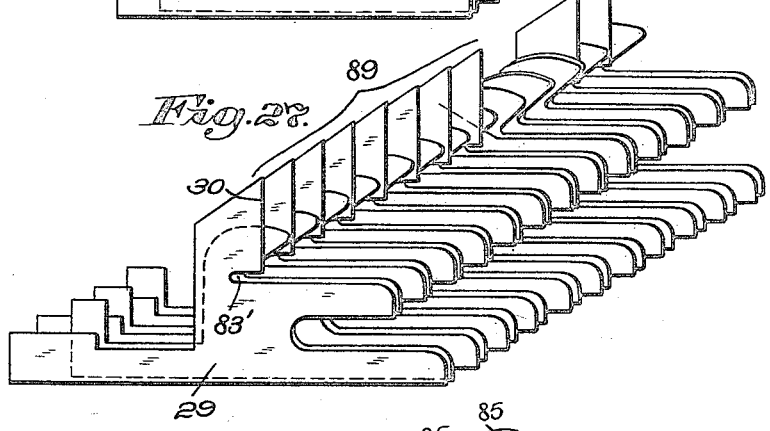
Figure 28:
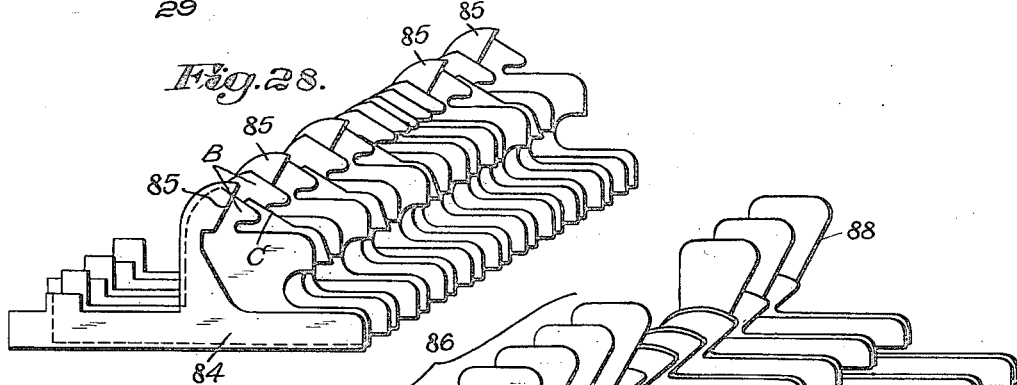
Figure 29:
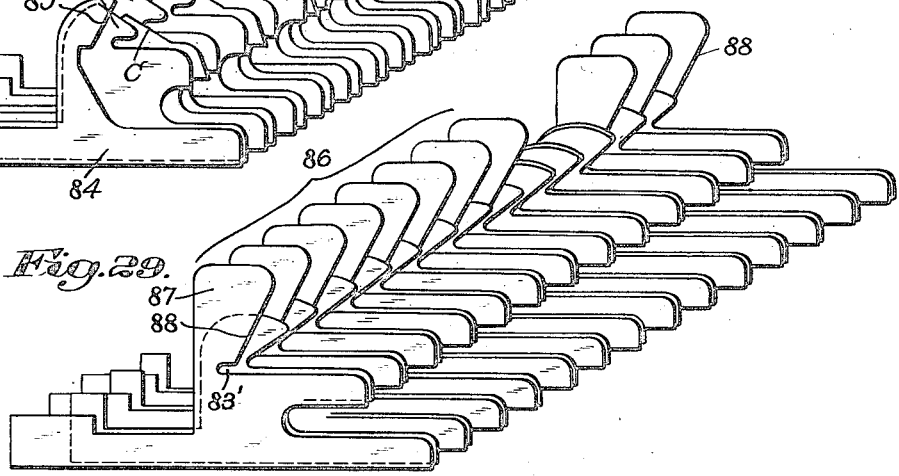

Figs. 12, 13 and 14 are details in vertical section upon the lines 12—12, 13—13 and 14—14 of Fig. 10;

Fig. 15 is a view partly in horizontal section and partly in plan, and representing regular web holders and the special instrumentalities and their operating cams;

Fig. 16 is a detail in vertical section representing one regular web holder and one special instrumentality in the same groove;

Fig. 17 is a vertical central section of the structure shown in Fig. 16;

Fig. 18 is a detail in plan representing the feeding of the two yarns for plaiting, the structure represented being of coarse gauge;

Fig. 19 is a detail in side elevation of the structure shown in Fig. 18 and showing also the knitting cams;

Fig. 20 is a plan view representing the arrangement of the cams, etc. in a fine gauge machine;

Fig. 21 is a vertical central section of the structure shown in Fig. 20;

Fig. 22 represents in perspective view a special instrumentality, a regular web holder and an instrument to even the dividing line of plaiting between normal and reverse plaiting, said parts as shown being particularly intended for fine gauge machines but not limited to such use;

Fig. 23 is a similar view representing a regular web holder, a special instrumentality, a line evener, and another special instrumentality, these being particularly adapted for the coarse gauge work;

Figs. 24 and 25 are similar views of modified forms;

Fig. 26 represents in perspective a sequential arrangement of special instrumentalities and regular web holders for making narrow stripes, particularly in fine gauge work;

Fig. 27 is a similar view of special instrumentalities and regular web holders particularly adapted for coarse work;

Fig. 28 represents a modified form of special instrumentality and its cooperating regular web holder;

Fig. 29 is a perspective view representing in sequential arrangement another form of special instrumentality with regular web holders, particularly applicable for coarse work;

Fig. 30 represents in six successive positions a needle, a special instrumentality and a regular web holder functioning in effecting reverse plaiting, particularly for fine gauge work;

Figs. 30$^a$, 30$^b$, 30$^c$ represent successive positions of the face and back yarns with relation to the needle in reverse plaiting;

Fig. 31 represents five successive positions of the needle, the special instrumentality and the regular web holder functioning in effecting reverse plaiting, particularly in coarse gauge work;

Fig. 32 is a view similar to Fig. 30 but representing a modified form of special instrumentality, particularly adapted for fine gauge work; and Fig. 33 is a view similar to Fig. 31 but representing a modified form of special instrumentality, particularly adapted for coarse work.

In my Patent Reissue No. 16,584, dated April 5, 1927, the original application whereof was filed August 6, 1925, I disclosed means for effecting reverse plaiting by the action of casting off mechanism, and thereby I effected striping extending lengthwise the hosiery or other knitted article. In the present application, I have disclosed means for effecting reverse plaiting through the action of special instrumentalities which in the disclosed embodiment of the invention are associated with web holders or like members and with the needles and I provide means for shifting or altering during the knitting operation the point or points at which the reverse plaiting is effected. In the disclosed embodiment of the invention the plaiting is effected in lines, bands or blocks extending lengthwise the hosiery or other article. In the disclosed embodiment of the invention the reverse plaiting is accomplished through the action of special instrumentalities, herein shown as each in the same groove in the web holder sinker ring as the regular web holder or like member for that needle. In other words, in the disclosed embodiment of the invention, I represent a special instrumentality and a regular web holder in one and the same groove between every two next adjacent needles, said members being here shown as distinct from and slidable longitudinally with respect to each other.

In Fig. 1 I have represented hosiery which may be a sock as shown or a stocking; it has a leg portion 1, a heel 2 made by narrowing and widening, a foot 3, and a toe 4 made by narrowing and widening, the article being a seamless one and constructed upon a circular knitting machine of independent needle type, such, for example, as upon the so-called Banner machine, a form whereof is disclosed in the patent to Joshua D. Hemphill, No. 933,443. In Fig. 2, I have represented upon a larger scale a portion of the fabric shown in Fig. 1 and in both of said figures, I have represented blocks 5 of reverse plaiting and intervening areas 6, 6 of normal plaiting. It is to be understood that the reverse plaiting may be in continuous bands of any desired width extending through the leg and foot of the stocking, or either thereof, but desirably not in the heel or toe, being discontinued therein under the dictation of the pattern or governing mechanism acting upon the cams that cause the special instrumentalities to function.

The fabric shown in Figs. 1 and 2 may be knitted upon either a fine gauge or a coarse gauge machine, but is particularly adapted for coarse gauge work, inasmuch as the bands or blocks of reverse plaiting are of considerable width.

Figure 4:
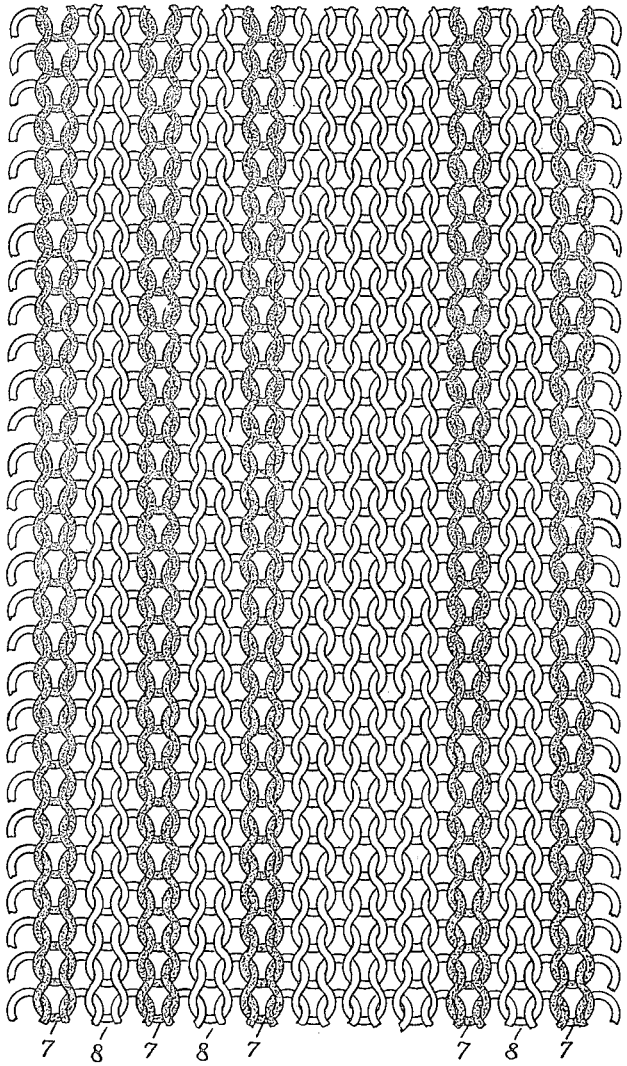
Fig. 4 is a view upon a much enlarged scale of a portion of the fabric shown in Fig. 3.
Figure 3:
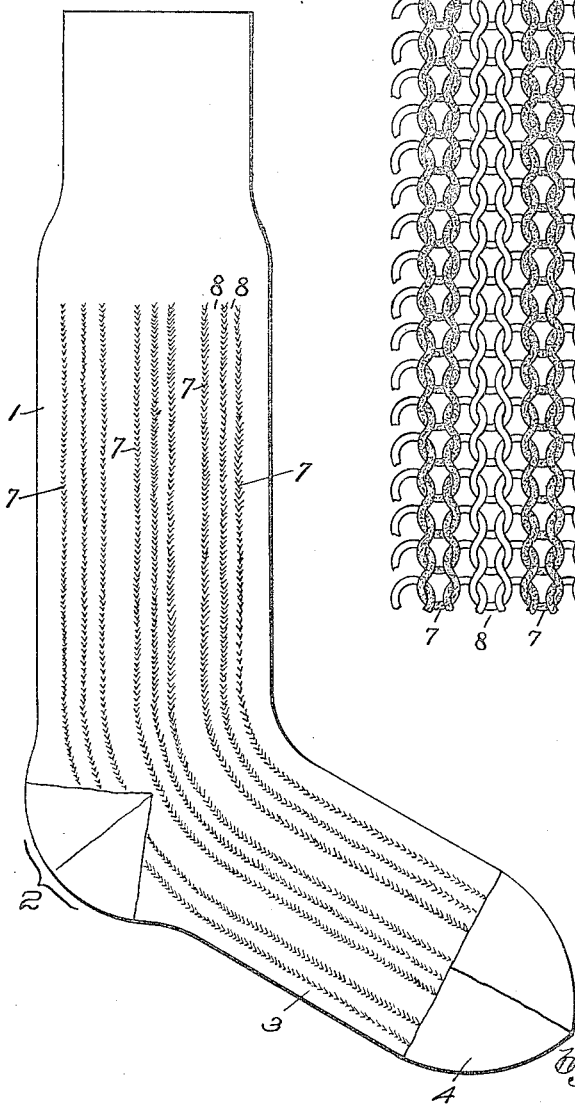
Fig. 3 is a view of a hose having narrow lengthwise extending stripes of reverse plaiting interposed between which are narrow and wider stripes of normal plaiting.

In Fig. 3 I have represented a sock made upon the same type of machine, that is to say, it is a seamless knit article of hosiery. It is shown as provided with narrow lengthwise extending stripes 7 of reverse of plaiting between which are lengthwise extending bands, areas or stripes 8 of normal plaiting. As shown, the stripes of reverse plaiting are each a single wale in width, though they may be of any desired width. This fabric, particularly with the very narrow reverse plaiting stripes, is preferably made on a fine gauge machine.

In the practice of my invention I provide desirably a special instrumentality for each needle and one of these instrumentalities is in this disclosure of my invention placed in the same groove as and with a regular web holder, so as to operate as hereinafter more fully described. Said special instrumentalities do not function as web holders or sinkers, though under certain conditions it might be possible to operate the mechanism in such manner as to give said instrumentalities a web holding function.

The machine herein shown as one upon which my invention may be practised need not be specifically described inasmuch as it is shown as the well known Banner or Hemphill machine. Briefly it is to be noted that the machine is of the independent needle type and that the needles are desirably latch needles. Therefore I employ a latch ring 9 equipped with suitable binder mechanism generally indicated at 10, and operatively connected to link and lever mechanism 11 controlled from the pattern drum indicated at 12 upon the pattern drum shaft 13. The entire mechanism is driven from the main drive shaft 14 having thereon the usual pulleys 15 and also the usual gearing for imparting rotary and reciprocating movements in a well known manner. The mechanism is also provided with the usual narrowing pickers and the usual widening pickers, one each of which is indicated at 16 and 17 respectively. These pickers are desirably those of the said Banner machine and require no further description. The needle cylinder is indicated at 18 and within the groves thereof are received the independently operated latch needles 19. At the upper end of the needle cylinder is provided the web holder receiving and operating mechanism which is generally similar to that of the Banner machine, but altered in accordance with my invention. As here shown I have represented the web holder bed ring at 20. Positioned thereabove is the outer ring member 21 of the cam ring as shown most clearly in the sectional views, Figs. 12, 13 and 17. Located within the ring 21, and for operative purposes forming a part thereof, is the ring 22, it being noted that between said rings is provided the cam path 23 for the tails or butts of the regular web holders or like instrumentalities. Viewing Fig. 10, it will be observed that I have provided substantially as usual the brackets 24, 25, which cooperate with the stationary upstanding bracket in suitably positioning the sinker or web holder cam ring for reciprocating knitting.

Although I have in this application disclosed my invention as applied to a coarse gauge machine, many features of the invention are substantially interchangeable or applicable to either or both types of machine. In both types of machine I provide a plurality—here shown as two—levers which act upon the special instrumentalities which for that purpose are made of two contrasting shapes at their outer ends so as to permit each lever to act only upon the special instrumentalities pertaining thereto, and arranged singly or in groups as desired throughout the circle of needles; but desirably I mount and position these two or other desired number of levers somewhat differently in the two types of machine, as will be hereinafter more fully pointed out. I will first refer to the organization for the coarse gauge machine but desire it clearly to be understood that while repeatedly throughout the specification I refer to a coarse gauge or to a fine gauge machine, I do so merely for purposes of description and with no intention of limiting the invention to either type of machine.

Referring particularly to Figs. 10, 15 and 17, the cam ring 21 and the inner ring 22 together provide or are furnished with an annular formation 27 against which ride the butts or tails of the web holders and the special instrumentalities. In that form of my invention here shown, the regular web holders are indicated at 28, and are shown as of typical or usual formation. They may be varied in form in accordance with operating conditions and my invention is in no wise limited to the particular form thereof shown. Each such web holder, (within which definition I include the so-called sinker) is mounted for in and out or radial sliding movement in a groove of the web holder bed ring and in each groove alongside of but desirably without mechanical connection therewith is provided the special instrumentality 29 here shown as having a vertical face 30 preferably upon its upper nib or portion, said face being adapted to engage what is the back yarn in normal plaiting and to push the same inward so that it becomes the face yarn for reverse plaiting. As the adjacent needle is moved downwardly in its needle groove the yarn which is engaging said face 30 to be pushed inward thereby, slides down said vertical face without being strained, as will be hereinafter more fully referred to.

The annular formation 27 of the sinker cam ring is at the proper point provided with a cam portion 31 for moving the web holders and special instrumentalities outward or for controlling or limiting their inward movement. At opposite sides of the cam 31 are the stationary cams 32, 33 for moving the web holders and special instrumentalities inward.

Radially outside of the cam portion 31 and at such a point as to engage with the outer end portions of the special instrumentalities are two levers 34, 35 which for the coarse gauge machine are desirably pivoted at 36 as shown most clearly in Figs. 10 and 15 upon a suitable bracket 37 secured to or formed with the web holder cam ring. The short ends 34' and 35' of said levers are actively engaged by springs 34'' and 35'', tending normally to force the opposite or functioning ends of said levers outwardly. Said opposite ends of said levers 34, 35 are here shown as having cam formations or faces 38, 39 which are normally moved out of functioning relation or position into outer or non-functioning position, by means of said springs 34'', 35'', it being understood that the function of said cam formations 38, 39 is to move the special instrumentalities inward so as to cause them to push the back thread of normal plaiting into position to be the face thread of reverse plaiting. I provide means preferably acting automatically to move the longer ends of said levers 34, 35 inwardly, and for that purpose have shown the following mechanism, to which my invention is in nowise restricted.

As shown most clearly in Figs. 6, 7, 8 and 10, I provide a bracket or standard 40 in which are mounted for sliding movement two bars 41, 42 of which the overlying or upper bar strikes a pin 43 upon the overlying cam lever 34 and the lower bar 42 strikes a pin 44 upon the underlying cam lever 35. Thus at times determined by the respective controlling means for the said bars one or the other of the said cams 34, 35 is moved radially inward sufficiently for it to cause said special instrumentalities controlled thereby to engage the back yard and effect reverse plaiting in a manner to be more fully described.

Figure 5:
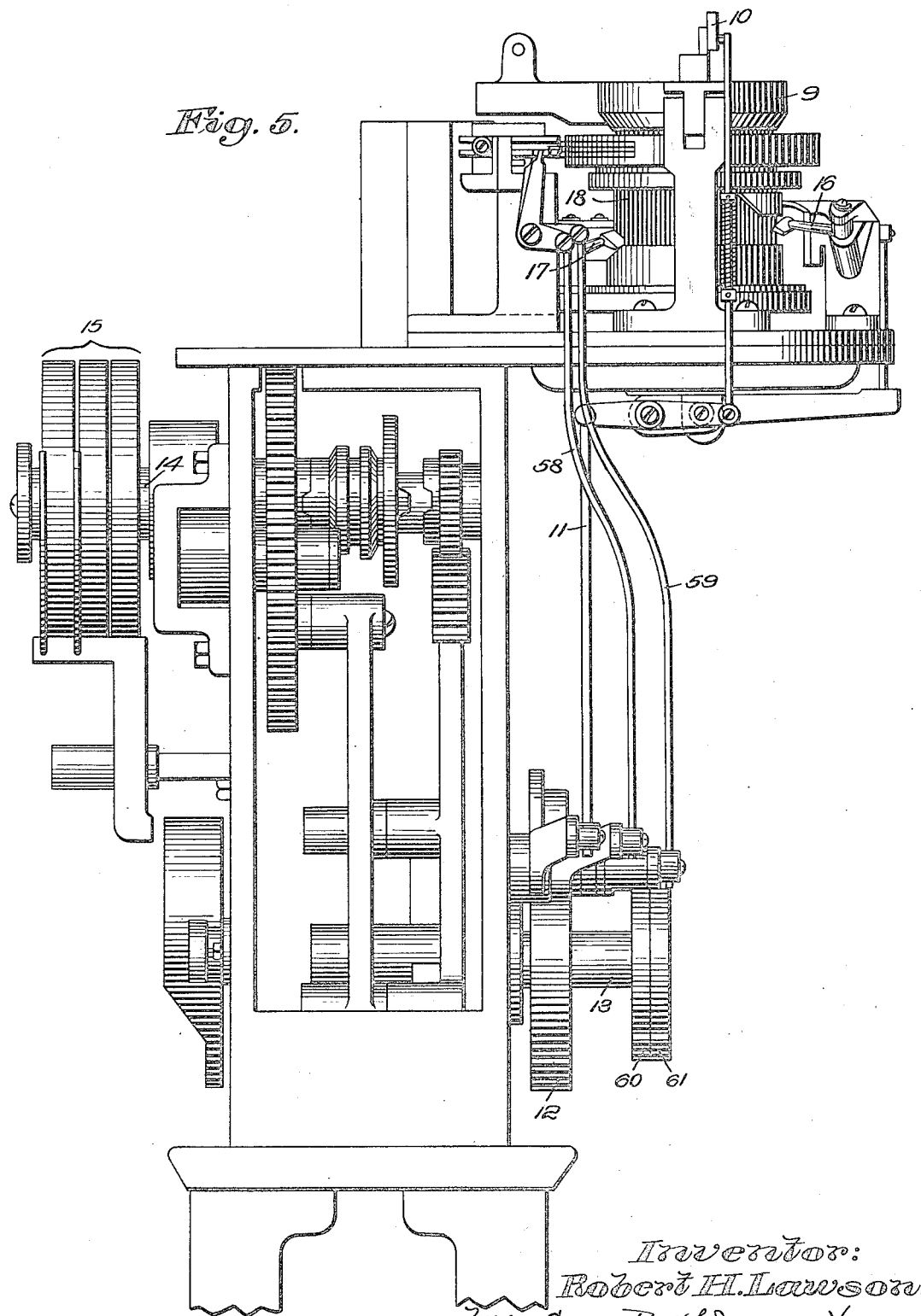
Fig. 5 is a rear elevation of a circular knitting machine having my invention applied thereto.

Each bar 41, 42 is connected by a pin, one of which is indicated at 45 in Fig. 10 to the proper lever 46, 47 pivoted at 48 upon the framing of the machine so as to be swung in a horizontal plane at the proper time. Said levers 46, 47 are notched at their outer ends as indicated at 49, 50, and are there engaged by the ends 51, 52 of bell crank levers 53, 54 pivoted at 55 upon the bracket 40 and respectively connected at 56, 57 to downwardly extending links 58, 59, which, as shown in Fig. 5, extend downward to controlling pattern disks or members 60, 61 upon the pattern shaft 13. Said disks or members 60, 61 are of proper shape to impart the in and out movements to said cam levers 34, 35 at the predetermined times, so as in the operation of the mechanism to cause reverse plaiting to occur whenever either of said cam levers 34, 35, or both of them, is or are moved inwardly. Said disks or members 60, 61 are so shaped as to cause reverse plaiting to cease during heel and toe work, and at that time a special heel and toe yarn is introduced.

In Fig. 20, I have represented in plan view corresponding cam levers for a fine gauge machine. The function of the said cam levers shown in Fig. 20 is essentially the same as that of the cam levers 34, 35, but the position thereof is somewhat different, though the means for operating the same may be and desirably are the same as those for operating the levers 34, 35 from the disks or members 60, 61 and hence need not be more particularly shown or described.

Viewing said Fig. 20, it will be evident that the stationary cams 31', 32' and 33' are substantially the same as the cams 31, 32, 33 shown in Fig. 15. The corresponding cam levers 34ª and 35ª are, however, pivoted at 62 upon the opposite sides of the head and the shorter ends of said levers 63, 64 are engaged by springs 65, 66 corresponding in function to the springs 34'', 35''. Said cam levers 34ª and 35ª are provided with appropriately shaped inner cam faces 67, 68, shown most clearly in Fig. 20.

In Figs. 18 and 19, I have represented in plan and in side elevation the feeding of two yarns in plaiting relation, namely, the black yarn 69 which in normal plaiting is the back yarn, and the white yarn 70, which in normal plaiting is the face yarn. These two yarns are supplied through corresponding yarn guides 69' and 70' mounted in usual manner with the group of yarn guides 71, so as to enter the throat 72 in a well understood manner. In proper relation to said yarn guides and the needles 19 are positioned the knitting cams 73.

Without limiting my invention I point out the following general distinctions between the work upon coarse gauge and fine gauge machines, referring to the materials best adapted to be used upon each and will refer to various forms of special instrumentalities, some of which are more particularly adapted for coarse work, others of which are more particularly adapted for fine gauge work, and some of which may be adapted for either gauge.

In coarse gauge work, desirably but not necessarily, both the face and the back yarn are wool. In fine gauge work a silk yarn is generally employed to be fed in plaiting relation to the outside or outer face in normal plaiting, a mercerized or cotton yarn being fed to the inside. Generally speaking, in coarse gauge work, a vertical face of the special instrumentality is employed, such as the vertical face 30 of Figs. 16 and 17. That vertical face engages the coarse back yarn and as the corresponding needle descends the said coarse yarn slides down the said vertical face 30 of the special instrumentalities, which is at the same time moving radially inward to reverse the plaiting. The coarse yarn—a relatively big wooly yarn, will not reverse in plaiting, as well or as readily as a fine wiry yarn. Therefore in finer gauge work the back yarn which is in reverse plaiting to become the face yarn, can be laid over the nose of the special instrumentalities and the latter can be drawn out more quickly (and yet obtain good results) than is desirable in coarse gauge work. The reason for this is that in the coarse gauge work the yarn is bigger and softer. Therefore in coarse gauge work the special instrumentality must stay in its radially inward position as long as possible consistent with proper operation of the machine, so as to hold the yarn engaged thereby, thus making sure that the reverse plaiting is permanent; otherwise the yarn so engaged is apt to slip back into normal plaiting position. A more wiry yarn, such as is used in fine gauge work, will readily stay where it is positioned by the special instrumentality, but this positioning is not so readily permanently accomplished in coarse gauge work. Therefore, other conditions being equal, in coarse gauge work the reverse plaiting special instrumentality is kept in longer than in fine gauge work, due to the difference in character of the yarn. Generally speaking, the front face of the special instrumentalities used in coarse gauge work should not slope backward but best results are obtained by the vertical edge. In the coarse gauge work the special instrumentality holds the yarn almost to the very instant of knitting. Furthermore in the coarse gauge work, generally speaking, the back yarn which is engaged by the edge of the special instrumentality and is pushed or moved into position to become the front yarn, is not in such inward movement shifted from its own plane, but remains substantially on the same level as the other yarn. In other words, for coarse work I desirably employ a vertical face upon the special instrumentality and that vertical face pushes the yarn directly inward, but without elevating the yarn out of its own plane, and the said yarn slides down that vertical face as the needle pertaining thereto descends. In most or certain forms of special instrumentalities for fine gauge work the face of such instrumentality that engages the back yarn to push or move the same so that it becomes the front yarn, acts slightly to loop said yarn up onto the sloping face so as slightly to lift it at this point above its own plane. This lifting action may be readily accomplished with silk yarns or yarns adapted for fine gauge work, but if this looping were employed in coarse gauge work, there would be a tendency to break the yarn, since, as already stated, such yarn must be held inwardly longer in order to insure the reverse plaiting becoming permanent. If such coarse yarn were looped up as stated and yet were too strong to break, such yarn would tend to snap back and therefore would not reverse correctly.

In Fig. 21, I have represented a form of special instrumentality 74 which is adapted to fine gauge work notwithstanding the fact that it is provided with a vertical back yarn engaging face 75. I do not claim in this application the construction of the special instrumentality or sinker 74 of the novel form shown in Figs. 21, 22, 26 and 30. A peculiarity of this form of special instrumentality and one which is peculiarly adapted to fine gauge work is the fact that leading from the upper edge 76 of the nib 77 is a downwardly inclined and backwardly extending notch or groove 78. The function of this notch or groove is to engage the yarns as most clearly shown in the several positions of Fig. 30, and positively to guide or move them under definite control of the upper and lower faces of said notch or groove 78, and particularly under the control of the upper face thereof. The upwardly and outwardly inclined edge 76 constitutes a wedge which serves to force the yarn it engages more tightly against the shank of the needle. In effecting this wedging action, the yarns passing over said wedge edge are lifted thereby and the downwardly inclined notch 78 serves to restore said yarns to the proper level with respect to the needle pertaining thereto.

It will be observed that I have provided mechanism for effecting plaiting and reverse plaiting in a knitted fabric, including a series of independent needles, thread engaging instrumentalities for each needle respectively, including regular web holders and including special instrumentalities where reverse plaiting is to be formed, all of said instrumentalities being movable individually transverse to the needle series, and thread guiding means to feed a back thread and a face thread in plaiting relation to the needles, each of said special instrumentalities having an outwardly and downwardly sloping edge adapted to receive at least one of said threads during loop formation and for the purpose of effecting reverse plaiting.

I have found that difficulty is experienced in securing an even or regular line of demarcation between normal plaiting and reverse plaiting. As the knitting progresses there is at times, owing to conditions of operation that need not be fully discussed, a liability that the line of demarcation may here and there advance or recede by a wale from the correct line. So far as I am aware, no one prior to my invention has effected reverse plaiting with a sharp line or edge of demarcation between the same and the normal plaiting areas on either side thereof, and particularly on the edge or side where a reverse plaiting area terminates. Particularly has this not been accomplished prior to my invention in a knitting machine having means for selecting, during the knitting operation, the needle or needles whereupon reverse plaiting is to occur. I have overcome this difficulty and have provided means whereby a sharp line of demarcation is provided, and particularly have I done this in an independent needle, knitting machine wherein there are means selectively controlled for effecting normal plaiting and reverse plaiting as desired, so as to produce pattern areas, spots, lines or other figures. My invention, therefore, is not limited in its application to an organization wherein reverse plaiting is effected by sinker action, but is of broad and general application. Without limiting my invention to the specific means and method by which I have effected the desired result, I will describe the means which I have selected as the disclosure for the present embodiment of the invention and which merely constitutes one embodiment of means for carrying out the broad purpose and principle of my invention. I have overcome this difficulty by providing what I herein for purposes of description refer to as a line evener. While such an instrumentality or device may in other forms of my invention be otherwise positioned, in the present disclosure, I associate it with a regular web holder, and therefore place the same in the same groove as and with a regular web holder, and at such position in the machine that it is located next after the last special instrumentality that is then to perform or effect reverse plaiting; in other words it is in the next radial groove considering the direction of rotation of the needle cylinder.

In Fig. 22, I have represented a group of members the first of which is a special instrumentality A, which may be and herein is substantially of the same form as the special instrumentality 74 of Fig. 21, it being provided with a vertical face 75 and a downwardly and backwardly inclined groove 78. Considering the direction in which the knitting machine turns in regular knitting, the special instrumentality is so positioned in a groove with a regular web holder as first to engage the yarn or is first in position with respect to the direction of travel. In the same groove therewith is a regular web holder B and in the next groove, assuming that the line of reverse plaiting is but a single wale in width, is located the line evener C, the characteristic whereof is the upwardly and rearwardly sloping edge 79. Whatever the width of the line or stripe, band or block of the reverse plaiting, the said line evener is located just after the far edge of the reverse plaiting, and the sloping edge 79 serves to bring the yarn which has been acted upon by the face 75 of the special instrumentality, down such sloping edge 79 so as to bring the said yarn into its proper position for normal plaiting. The rear end of the special instrumentalities A may be shaped as shown at 80 to be engaged by the proper cam lever and the rear end of the line evener C may be shaped as shown at 81 or otherwise as desired, so as to engage the proper cam lever. The members shown in Fig. 22 are especially adapted for fine gauge work.

As shown, the special instrumentality A is adapted to be operated by the overlying cam lever as 34ᵃ and the line evener C is adapted to be operated by the underlying cam lever 35ᵃ.

In Fig. 23, I have represented a group of members particularly adapted to be used in coarse work. Therein I have represented at 28 a regular web holder such as shown in Fig. 17. I have also shown at 29 a special instrumentality having a vertical face 30. At C' I have represented a line evener of the general character shown at C in Fig. 22 and having the same function, but slightly differently shaped in order to cause it to function with the particular members with which it is directly associated in coarse gauge work. It is provided with a sloping face 79'. I have also shown in this figure a special instrumentality 29' which differs from that shown at 29 only in that the rear end formation 82 is such as to cause it to be engaged by the cam lever 34, whereas the rear formation 83 of the special instrumentality 29 is such as to cause that to be engaged by the cam lever 35.

In Fig. 24 I have shown three members particularly adapted for fine gauge work. The regular web holder B and the line evener C are the same as shown in Fig. 22, but the special instrumentality 84 is provided with a backwardly and downwardly inclined edge 85 to engage the back yarn and move the same into reverse plaiting position. Under certain conditions I have found the shape of the member 84 to be most effective. In each case disclosed herein I desirably always place a special instrumentality or a line evener in a groove with a regular web holder or like instrumentality.

In Fig. 25, I have shown certain members particularly adapted for coarse gauge work. Therein I have represented at 28 a regular web holder and at C' a line evener similar to those in Fig. 23. At 86, I have represented a special instrumentality having a much enlarged upper nib 87, a characteristic whereof is the downwardly and rearwardly sloping edge 88. It will be observed that at the base of said edge is a horizontal groove 83', which horizontal groove is also characteristic of the special instrumentalities shown in Fig. 23. I have also in said figure shown a special instrumentality 86' which differs from that shown at 86 only that the former is adapted to be operated by cam lever 34, whereas the latter is adapted to be operated by cam lever 35.

In Fig. 26 I have illustrated in sequential arrangement special instrumentalities, regular web holders and line eveners. As herein shown the needles are to be understood as travelling toward the left in said figure, that is, in a contraclockwise direction, and each line of reverse plating would be but a single wale in extent.

It will be evident from the foregoing description that immediately succeeding the last needle intended at any area to effect reverse plaiting, means act to press the yarn or yarns against the shank of the next plaiting needle which, if the tensioning of the yarns be as shown in my Reissue Patent No. 16,584, would be the more heavily tensioned yarn. Such yarn is pressed harder against the shank of the said next plaiting needle, and this action takes place also on the last normal plaiting needle before reverse plaiting is commenced at any area.

In accordance with my invention, I subject at least one of the two plaiting threads to pressure at the outgoing edge of the said predetermined reverse plaiting area, such pressure being other than the tension or pressure to which the thread or threads is or are subjected in the feeding control thereof. Such pressure is effective at the needle at which return is to be made to normal plaiting and is substantially localized at the said needle and is exerted or rendered effective against the needle and usually in and along the hook of the needle in the stitch forming operation. Obviously my invention is not limited in its scope to the means herein disclosed for producing the pressure at substantially the point indicated.

It will also be evident that in a circular knitting machine of the independent needle type, to which two yarns are fed in a plaiting relation, I have provided means selectively controlled for knitting normal plaited or reverse plaited fabric as desired, said means acting to cause the yarns at the needle wale or wales next following the last reverse plaited wale or wales to return to their normal plaiting relation.

It will also be clear from the foregoing description that I have provided means for effecting reverse plaiting at a desired wale or wales, including members transversely movable with respect to the needles, certain of said members acting at times to cause tension to be imposed upon the yarns in a direction substantially radial to the needle circle, such tension causing the yarns at a needle wale or wales next following the reverse plaited wale or wales to show on the face of the fabric in normal plaiting relation.

It will also be understood that in a circular knitting machine organization wherein two yarns are fed to the needles in a plaiting relation, I have provided means acting to cause tension to be imposed upon the yarns at a certain needle or needles and in a direction substantially radial to the needle circle, such tension causing the yarns at such certain needle or needles to be knit in the fabric in a normal plaiting relation.

It will also be clear from the foregoing description that in a circular knitting machine, independent needle organization, wherein means are provided for feeding two yarns to the needles in a plaiting relation, I have provided means to reverse the plating relation at a certain needle wale and acting to cause tension to be imposed upon the yarns at a needle wale next adjacent to the aforesaid wale and in a direction substantially radial to the needle circle, such tension causing the yarns at the said certain needle wale to show on the face of the fabric in normal plaiting relation. The means provided by me acts to insure return of the yarns to normal plaiting relation at a needle wale next adjacent to the needle wale whereat it is intended to terminate a reverse plaiting area, whether it be a line of a single needle width only or a wider area.

In Fig. 27, I have represented in sequential arrangement sufficient special instrumentalities 29 to form a block or band of substantial or relatively great width, the group of such special instrumentalities for this purpose being indicated at 89. To the right beyond said group 89 are shown two special instrumentalities of another group.

In Fig. 28, I have represented for fine work in proper functioning relation in the same groove a special instrumentality 84 and a regular web holder of the general form shown at B in Fig. 24.

In Fig. 29 I have represented in sequential arrangement for forming one block, band or stripe of relatively great width, a group of special instrumentalities 86 similar to that shown in Fig. 25, each of these being associated with and being in the same groove as a regular web holder 28.

In Fig. 30 I have represented six successive positions assumed by the special instrumentality A in effecting reverse plaiting, particularly in fine gauge work. Therein the back yarn appearing as such in normal plaiting is represented at 90 as a black yarn, and at 91 I have represented as a white yarn the face yarn of normal plaiting. In effecting reverse plaiting, the edge 75 of the special instrumentality A engages the back yarn 90 and in the ensuing movements of the special instrumentality and of the needle 19 the two yarns respectively assume the positions shown in said figure.

In Figs. 30$^a$, 30$^b$ and 30$^c$, I have represented successive positions of the yarns 90 and 91 in forming reverse plaiting.

In Fig. 31, I have represented a series of positions assumed by the special instrumentality 29, particularly in coarse gauge knitting, and have there shown the successive positions of the two yarns 90 and 91. In both Figures 30 and 31, the position and the function of the regular web holder are also clearly indicated.

In Fig. 32 I have represented for fine gauge work that form of special instrumentality shown at 84 for effecting reverse plaiting; and in Fig. 33 I have shown for coarse gauge work that form of special instrumentality represented in 86 for reverse plaiting, and in the successive positions in said figures have represented the function and operation of the special instrumentalities and of the regular web holders in effecting reverse plaiting.

While I have shown the special instrumentalities and the line eveners as mounted or positioned for sliding movement in the grooves of the regular web holders outside the needle circle so that they serve to push the back yarn into reverse plaiting position, it is to be understood that my invention is not necessarily limited to a location of said members outside the needle circle.

Having thus described certain illustrative embodiments of my invention, I desire it to be understood that although specific terms are employed, they are used in a generic and descriptive sense, and not for purposes of limitation, the scope of the invention being set forth in the following claims.

Claims:

1. Mechanism for producing knitted fabric having normal plaiting and reverse plaiting areas comprising, in combination, a series of independent needles, means to feed two yarns thereto in plaiting relation, a series of web holders or like instrumentalities, one for each needle and movable into and out in the knitting operation, a series of special instrumentalities, each having a formation for yarn engagement, whereby reverse plaiting is effected, and a line evener to maintain a line of demarcation between normal and reverse plaiting areas.

2. Mechanism for producing knitted fabric having normal plaiting and reverse plaiting areas comprising, in combination, a series of independent needles, means to feed two yarns thereto in plaiting relation, a series of web holders or like instrumentalities, one for each needle and movable into and out in the knitting operation, a series of special instrumentalities, each having a formation for warn engagement, whereby reverse plaiting is effected, and a line evener to engage a yarn at the termination of a reverse plaiting area and cooperating in effecting return to normal plaiting.

3. Mechanism for producing knitted fabric having normal plaiting and reverse plaiting areas comprising, in combination, a series of independent needles, means to feed two yarns thereto in plaiting relation, a series of web holders or like instrumentalities, one for each needle and movable into and out in the knitting operation, a series of special instrumentalities, each having a formation for yarn engagement, whereby reverse plaiting is effected, and a series of line eveners positioned to engage yarn at the lateral edge of reverse plaiting areas and cooperating to insure a clear line of demarcation between normal plaiting and reverse plaiting areas.

4. Mechanism for producing knitted fabric having normal plaiting and reverse plaiting areas comprising, in combination, a series of independent needles, means to feed two yarns thereto in plaiting relation, a series of web holders or like instrumentalities, one for each needle and movable into and out in the knitting operation, a series of special instrumentalities, each having a formation for yarn engagement, whereby reverse plaiting is effected, said special instrumentalities movable in and out in the knitting operation, and a series of line eveners to maintain a line of demarcation between normal and reverse plaiting areas and also movable in and out in the knitting operation.

5. A line evener having a formation to engage one of two plaiting yarns at the line of demarcation between normal plaiting and reverse plaiting, and cooperating to keep said line of demarcation substantially exact.

6. A line evener having a formation to engage one of two plaiting yarns where change is made from reverse plaiting to normal plaiting, said line evener being adapted to be received in a guide way for in and out movement with relation to a series of needles.

7. In a knitting organization, a series of needles and one or more line eveners having in and out movement therebetween and acting to engage one of two plaiting yarns at the point where change is made from reverse plaiting to normal plaiting, and cooperating to render the line of demarcation substantially exact.

8. A line evener adapted to slide in a groove between knitting needles and having an upwardly and rearwardly sloping face 79 to engage one of two plaiting yarns at the line of demarcation between normal plaiting and reverse plaiting, and cooperating to keep said line of demarcation substantially exact.

9. In combination, a line evener and a web holder, both adapted to be mounted in the same groove in a web holder bed ring and slidable independently therein, said line evener having a formation to engage at least one of two plaiting yarns substantially at the line of demarcation of the normal plaiting and reverse plaiting and cooperating to keep said line of demarcation substantially exact.

10. In a circular knitting machine of the independent needle type, mechanism for knitting plaited fabric with accurately laterally-edged reverse plaiting areas comprising feeding means to feed two knitting threads in such manner as to result in incorporating said threads into the knitted fabric in a normal plaiting relation, means for effecting reverse plaiting at a desired wale or wales, and means, other than the yarn feeding means, transversely movable with respect to the needles, to cause pressure to be imposed upon at least one of the said yarns in a direction substantially radial to the needle circle, such pressure cooperating to cause the desired yarn at a needle wale or wales next following the reverse plaited wale or wales to show on the face of the fabric in normal plaiting relation.

11. In a circular knitting machine of the independent needle type, mechanism for knitting plaited fabric with accurately laterally-edged reverse plaiting areas comprising feeding means to feed two knitting threads in such manner as to result in incorporating said threads into the knitted fabric in a normal plaiting relation, means for effecting reverse plaiting at selected wales as desired and means other than the normal plaiting means, movable in a direction transverse to the needles and by said transverse movement acting to cause a needle wale following the last reverse plaited needle wale to be knit with certainty in the fabric with the yarns in plain plaiting relation.

12. In a circular knitting machine of the independent needle type having a circular series of independent needles and sinkers, feeding means to feed two knitting threads in such manner as to result in incorporating said threads into the knitted fabric in a normal plaiting relation, and other means consisting of jack-like members independently and transversely movable with relation to the needles and adapted to be moved toward the needles to cause the yarns to be tensioned against a needle shank, thereby insuring that the wale knit in a certain course and at such needle will be knit in the fabric in plain plaiting relation following a reverse plaited area.

13. That method of knitting plaited fabric with accurately laterally-edged reversed plaiting areas comprising feeding two knitting threads in such manner as to result in incorporating the said threads into the knitted fabric in a normal plaited relation, selectively controlling normal plaiting and reverse plaiting in the fabric as desired, and in so doing causing, otherwise than by the feeding of the yarns in a plaiting relation, the yarns at the needle wale or wales next following the last reverse plaited wale or wales to return with certainty to their normal plaiting relation, whereby their return to normal plaiting is not left to the mere tendency to return to normal plaiting because of their being fed in a plaiting relation.

14. A circular independent needle knitting machine for knitting plaited fabric with accurately laterally-edged reverse plaiting areas comprising feeding means to feed two knitting threads in such manner as to result in incorporating the said threads into the knitted fabric in a normal plaiting relation, means selectively acting during the knitting operation for turning the yarns to secure reverse plaiting, and instrumentalities other than the yarn feeding means, to turn the yarns back to normal plaiting, whereby the turning of the yarns back to normal plaiting is not left to the action of the yarns themselves.

15. That method of knitting plaited fabric with accurately laterally-edged reversed plaiting areas comprising feeding two knitting threads in such manner as to result in incorporating the said threads into the knitted fabric in a normal plaited relation, mechanically turning said yarns to secure reverse plaiting, and mechanically turning said yarns back to normal plaiting at a needle wale next following the last intentionally reverse plaited wale, otherwise than by the said feeding of the yarns in plaiting relation, whereby the turning of the yarns back to normal plaiting is not left to the action of the yarns themselves.

16. In an independent needle knitting machine a series of independent needles, feeding means to feed two knitting threads thereto in such manner as to result in incorporating said threads into the knitted fabric in a normal plaiting relation, and means other than said feeding means, cooperating to effect reverse plaiting according to pattern automatically variable during the knitting operation, and to effect restriction of the reverse plaiting to the exact wale or wales intended by the pattern by insuring return to normal plaiting thereat.

17. In an independent needle knitting machine a series of independent needles, feeding means to feed two knitting threads to the needles in such manner as to result in incorporating said threads into the knitted fabric in a normal plaiting relation, and cooperating means, other than said feeding means, to effect reverse plaiting according to the pattern automatically variable during the knitting operation, and to effect at the outgoing edge of the reverse plaiting area restriction of the reverse plaiting to the exact wale or wales intended by the pattern by insuring return to normal plaiting thereat.

18. In an independent needle knitting machine a series of independent needles, feeding means to feed two knitting threads to the needles in such manner as to result in incorporating said threads into the knitted fabric in a normal plaiting relation, and cooperating means, other than said feeding means, to effect reverse plaiting according to pattern automatically variable during the knitting operation and to effect lateral termination of the reverse plaiting at the sinker wale immediately following the needle wales whereat the reverse plaiting should terminate according to the selection indicated by the pattern by insuring return to normal plaiting thereat.

19. In a circular knitting machine of the independent needle type for knitting plaited fabric with accurately laterally-edged reverse plaiting areas, a circular series of independent needles, sinkers, feeding means to feed two knitting threads to the needles in such manner as to result in incorporating said threads into the knitted fabric in a normal plaiting relation, other means consisting of jacks independently and transversely movable with relation to the needles at needle wales where reverse plaiting is to be terminated and adapted by movement toward the needles to insure the return of the yarns to normal plaiting relation at a needle wale next adjacent to the aforesaid needle wale whereat a jack is positioned.

20. A knitting machine of the independent needle type for knitting plaited fabric with accurately laterally-edged reverse plaiting areas comprising a series of independent needles, sinkers, feeding means to feed two knitting threads to the needles in such manner as to result in incorporating said threads into the knitted fabric in a normal plaiting relation, and other means consisting of jacks independently and transversely movable with relation to the needles where reverse plaiting is to be terminated and adapted by movement toward the needles to insure the return of the said two yarns to normal plaiting relation at a needle wale next adjacent to the aforesaid needle wale whereat a jack is positioned.

21. That method of knitting plaited fabric with accurately laterally-edged reverse plaiting areas comprising feeding two knitting threads in such manner as to result in incorporating the said threads into the knitted fabric in a normal plaited relation, acting on at least one of said threads in such manner as to obtain reverse plaiting of said two threads at a predetermined wale or wales and insuring certain return of said threads to a normal plaiting relation at the wale next beyond the wale whereat the reverse plaiting was intended to terminate, by subjecting at least one of said threads to pressure at the ou going edge of said predetermined reverse plaiting area, otherwise than by the feeding control of the said threads in feeding said threads as hereinbefore stated, whereby return to normal plaiting is not left to the mere tendency of the said thread or threads to return to normal plaiting because of their said feeding manner.

22. That method of knitting plaited fabric with accurately laterally-edged reverse plaiting areas upon a series of independent needles while independently operating said needles, comprising feeding two knitting threads to the said needles in such manner as to result in incorporating said threads into the knitted fabric made by said needles in a normal plaiting relation, acting on at least one of said threads in such manner as to obtain reverse plaiting of said two threads at a predetermined wale or wales and insuring certain return of said threads to a normal plaiting relation at the wale next beyond the wale whereat the reverse plaiting was intended to terminate, by subjecting at least one of said threads to pressure at the outgoing edge of said predetermined reverse plaiting area otherwise than by the feeding control of the said threads in feeding said threads as hereinbefore stated, whereby return to normal plaiting is not left to the mere tendency of the said thread or threads to return to normal plaiting because of their said feeding manner.

23. That method of knitting plaited fabric with accurately laterally-edged reverse plaiting areas comprising feeding two knitting threads in such manner as to result in incorporating the said threads into the knitted fabric in a normal plaited relation, acting on at least one of said threads in such manner as to obtain reverse plaiting of said two threads at a predetermined wale or wales and insuring certain return of said threads to a normal plaiting relation at the wale next beyond the wale whereat the reverse plaiting was intended to terminate, by subjecting at least one of said threads to pressure in a direction transverse to the needle series at the outgoing edge of the said predetermined reverse plaiting area otherwise than by the feeding control of said threads in feeding the threads as hereinbefore stated, whereby return to normal plaiting is not left to the mere tendency of the thread or threads to return to normal plaiting because of their said feeding manner.

24. That method of knitting plaited fabric with accurately laterally-edged reverse plaiting areas comprising feeding two knitting threads in such manner as to result in incorporating the said threads into the knitted fabric in a normal plaited relation, acting on at least one of said threads in such manner as to obtain reverse plaiting of said two threads at a predetermined wale or wales and insuring certain return of said threads to a normal plaiting relation at the wale next beyond the wale whereat the reverse plaiting was intended to terminate, by subjecting at least one of said threads to pressure at the outgoing edge of said predetermined reverse plaiting area, otherwise than by the feeding control of the said threads in feeding said threads as hereinbefore stated, whereby return to normal plaiting is not left to the mere tendency of the said thread or threads to return to normal plaiting because of their said feeding manner, and during the knitting operation selectively varying the wale or wales at which a reverse plaiting area is made.

25. That method of knitting plaited fabric with accurately laterally-edged reverse plaiting areas comprising feeding two knitting threads in such manner as to result in incorporating the said threads into the knitted fabric in a normal plaited relation, acting on at least one of said threads in such manner as to obtain reverse plaiting of said two threads at a predetermined wale or wales and insuring certain return of said threads to a normal plaiting relation at the wale next beyond the wale whereat the reverse plaiting was intended to terminate, by subjecting at least one of said threads to pressure at the outgoing edge of said predetermined reverse plaiting area, otherwise than by the feeding control of the said threads in feeding said threads as hereinbefore stated, whereby return to normal plaiting is not left to the mere tendency of the said threads or threads to return to normal plaiting because of their said feeding manner, and during the knitting operation selectively varying the wale or wales at which a reverse plaiting area is made, and correspondingly varying the wale at which return to normal plaiting is insured as hereinbefore stated.

26. That method of knitting plaited fabric with accurately laterally-edged reverse plaiting areas comprising feeding two knitting threads in such manner as to result in incorporating the said threads into the knitted fabric in a normal plaited relation, acting on at least one of said threads in such manner as to obtain reverse plaiting of said two threads at a predetermined wale or wales and insuring certain return of said threads to a normal plaiting relation at the wale next beyond the wale whereat the reverse plaiting was intended to terminate, by subjecting at least one of said two threads to pressure otherwise than by and in excess of tension or pressure caused by the feeding control of the said threads in feeding them as hereinbefore stated, such pressure being effective at the needle at which return is to be made to normal plaiting, whereby return to normal plaiting is not left to the mere tendency of the said thread or threads to return to normal plaiting because of their said feeding manner.

27. That method of knitting plaited fabric with accurately laterally-edged reverse plaiting areas comprising feeding two knitting threads in such manner as to result in incorporating the said threads into the knitted fabric in a normal plaited relation, acting on at least one of said threads in such manner as to obtain reverse plaiting of said two threads at a predetermined wale or wales and insuring certain return of said threads to a normal plaiting relation at the wale next beyond the wale whereat the reverse plaiting was intended to terminate, by subjecting at least one of said two threads to pressure otherwise than by and in excess of tension or pressure caused by the feeding control of the said threads in feeding them as hereinbefore stated, such pressure being transverse to the needle series and localized substantially at the hook of the needle where it is desired to return to normal plaiting, whereby return to normal plaiting is not left to the mere tendency of the thread or threads to return to normal plaiting because of their said feeding manner.

28. That method of knitting plaited fabric with accurately laterally-edged reverse plaiting areas comprising feeding two knitting threads in such manner as to result in incorporating the said threads into the knitted fabric in a normal plaited relation, acting on at least one of said threads in such manner as to obtain reverse plaiting of said two threads at a predetermined wale or wales and insuring certain return of said threads to a normal plaiting relation at the wale next beyond the wale whereat the reverse plaiting was intended to terminate, by subjecting at least one of said two threads to pressure otherwise than by and in excess of tension or pressure caused by the feeding control of the said threads in feeding them as hereinbefore stated, such pressure being transverse to the needle series and localized substantially at the hook of the needle whereat it is desired to return to normal plaiting, whereby return to normal plaiting is not left to the mere tendency of the thread or threads to return to normal plaiting because of their said feeding manner.

29. Mechanism for knitting upon independent needles plaited fabric with accurately laterally-edged reverse plaiting areas comprising feeding means to feed two knitting threads in such manner as to result in incorporating said threads into the knitted fabric in a normal plaiting relation, and cooperating means other than said feeding means, to act on at least one of said threads in such manner as to obtain reverse plaiting of said two threads at a predetermined wale or wales of the fabric and also insuring certain return of said threads to a normal plaiting relation at the wale next beyond the wale whereat the reverse plaiting was intended to terminate, by subjecting at least one of said threads to pressure at the outgoing edge of said predetermined reverse plaiting area other than the tension or pressure incident to the feeding control of said feeding means, whereby return to normal plaiting is not left to the mere tendency of the said thread or threads to return to normal plaiting because of said feeding means.

30. Mechanism for knitting upon independent needles plaited fabric with accurately laterally-edged reverse plaiting areas comprising feeding means to feed two knitting threads in such manner as to result in incorporating said threads into the knitted fabric in a normal plaiting relation, and cooperating means other than said feeding means, to act on at least one of said threads in such manner as to obtain reverse plaiting of said two threads at a predetermined wale or wales of the fabric and also insuring certain return of said threads to a normal plaiting relation at the wale next beyond the wale whereat the reverse plaiting was intended to terminate, by subjecting at least one of said threads to pressure in a direction transverse to the needle series, at the outgoing edge of the said predetermined reverse plaiting area, other than the tension or pressure incident to the feeding control of said feeding means, whereby return to normal plaiting is not left to the mere tendency of the said thread or threads to return to normal plaiting because of said feeding means.

31. Mechanism for knitting upon independent needles plaited fabric with accurately laterally-edged reverse plaiting areas comprising feeding means to feed two knitting threads in such manner as to result in incorporating said threads into the knitted fabric in a normal plaiting relation, and cooperating means other than said feeding means to act on at least one of said threads in such manner as to obtain reverse plaiting of said two threads at a predetermined wale or wales of the fabric and also insuring certain return of said threads to a normal plaiting relation at the wale next beyond the wale whereat the reverse plaiting was intended to terminate, by subjecting at least one of said threads to pressure at the outgoing edge of said predetermined reverse plaiting area other than the tension or pressure incident to the feeding control of said feeding means, whereby return to normal plaiting is not left to the mere tendency of the said thread or threads to return to normal plaiting because of said feeding means, and means for selectively varying during the knitting operation the wale or wales at which a reverse plaiting area is made.

32. Mechanism for knitting upon independent needles plaiting fabric with accurately laterally-edged reverse plaiting areas comprising feeding means to feed two knitting threads in such manner as to result in incorporating said threads into the knitted fabric in a normal plaiting relation, and cooperating means other than said feeding means to act on at least one of said threads in such manner as to obtain reverse plaiting of said two threads at a predetermined wale or wales of the fabric and also insuring certain return of said threads to a normal plaiting relation at the wale next beyond the wale whereat the reverse plaiting was intended to terminate, by subjecting at least one of said threads to pressure at the outgoing edge of said predetermined reverse plaiting area other than the tension or pressure incident to the feeding control of the said feeding means, whereby return to normal plaiting is not left to the mere tendency of the said thread or threads to return to normal plaiting because of said feeding means, and means for selectively varying during the knitting operation the wale or wales at which a reverse plaiting area is made, and for correspondingly varying the wale at which return to normal plaiting is insured.

33. Mechanism for knitting upon independent needles plaited fabric with accurately laterally-edged reverse plaiting areas comprising feeding means to feed two knitting threads in such manner as to result in incorporating said threads into the knitted fabric in a normal plaiting relation, and cooperating means other than said feeding means, to act on at least one of said threads in such manner as to obtain reverse plaiting of said two threads at a predetermined wale or wales of the fabric and also insuring certain return of said threads to a normal plaiting relation at the wale next beyond the wale whereat the reverse plaiting was intended to terminate, by subjecting at least one of said threads to pressure effective at the needle at which return is to be made to normal plaiting, said pressure being other than pressure or tension incident to the feeding control of the said feeding means whereby return to normal plaiting is not left to the mere tendency of the said thread or threads to return to normal plaiting because of said feeding means.

34. In a circular knitting machine of the independent needle type, a circular series of independent needles, sinkers therefor, means to feed two threads to said needles in a plaiting relation and including means to subject a certain one of said two threads to a greater tension than the other during both normal and reverse plaiting, and cooperating means for effecting reverse plaiting at a certain wale or wales and insuring the return of the said threads to normal plaiting at the wale next following the wale whereon reverse plaiting was intended to terminate, said cooperating means including instrumentalities other than said thread feeding means to subject at least one of said two threads to the action of localized pressure transverse to the needle circle and effective at the needle at which it is desired to return to normal plaiting to insure such return to normal plaiting at said needle whereby return to normal plaiting is not left to the natural tendency of the threads as fed to return to normal plaiting.

In testimony whereof, I have signed my name to this specification.

ROBERT H. LAWSON.